US007640874B2

(12) United States Patent
Hoehn

(10) Patent No.: US 7,640,874 B2
(45) Date of Patent: Jan. 5, 2010

(54) SEEDING IMPLEMENT WITH FRONT ROCKSHAFT-MOUNTED FERTILIZER OPENERS

(75) Inventor: Kevin William Hoehn, Bettendorf, IA (US)

(73) Assignee: Deere & Company, Moline, IL (US)

( * ) Notice: Subject to any disclaimer, the term of this patent is extended or adjusted under 35 U.S.C. 154(b) by 776 days.

(21) Appl. No.: 10/967,502

(22) Filed: Oct. 18, 2004

(65) Prior Publication Data

US 2006/0081162 A1 Apr. 20, 2006

(51) Int. Cl.
*A01B 3/06* (2006.01)
*A01B 63/00* (2006.01)
*A01C 5/00* (2006.01)
*A01C 7/18* (2006.01)

(52) U.S. Cl. .................... 111/66; 172/482; 172/668; 172/671

(58) Field of Classification Search .............. 172/482, 172/668, 663, 671, 507; 111/52, 66
See application file for complete search history.

(56) References Cited

U.S. PATENT DOCUMENTS

| 1,160,120 | A | * | 11/1915 | Allen | 172/429 |
| 2,721,525 | A | * | 10/1955 | Northcote | 111/52 |
| 2,766,671 | A | * | 10/1956 | Lauenstein | 172/146 |
| 3,124,201 | A | * | 3/1964 | Downing et al. | 172/303 |
| 4,796,550 | A | | 1/1989 | Van Natta et al. | 111/87 |
| 5,228,522 | A | * | 7/1993 | Stufflebeam et al. | 172/413 |
| 5,911,279 | A | * | 6/1999 | Whitener | 172/668 |
| 6,032,593 | A | | 3/2000 | Wendling et al. | 111/187 |
| 6,371,215 | B2 | * | 4/2002 | Friggstad | 172/311 |
| 2003/0110995 | A1 | * | 6/2003 | Hall et al. | 111/52 |
| 2003/0164125 | A1 | | 9/2003 | Paluch et al. | |

OTHER PUBLICATIONS

John Deere Air Seeding Equipment brochure—Front page, p. 12, 13, 14, 15, and back page.

* cited by examiner

*Primary Examiner*—Christopher J. Novosad

(57) ABSTRACT

A combination fertilizer and seeding Implement includes a front section of disk type fertilizer openers and a rear section of frame mounted seed openers. The fertilizer openers are connected by drawbars to a rockshaft which is vertically adjustable to accommodate different ranges of operating depths of the frame mounted tools. Shank depth is set by frame height, and the vertical adjustability of the rockshaft facilitates a wide range of frame operating heights for different tool depths while maintaining optimum disk opener drawbar angles.

20 Claims, 4 Drawing Sheets

SEEDING IMPLEMENT WITH FRONT ROCKSHAFT-MOUNTED FERTILIZER OPENERS

FIELD OF THE INVENTION

The present invention relates generally to agricultural implements and, more specifically, to such implement having different sets of vertically adjustable tools including a set of rockshaft mounted tools.

BACKGROUND OF THE INVENTION

During agricultural seeding operations, placing fertilizer in soil at controlled separation from seed helps prevent high fertilizer concentrations from harming the young plants. Machines are available with a machine configuration having separate openers for seed and fertilizer. With many of the separate opener configurations, there is a reduced number of fertilizer openers. Typically there is one fertilizer opener for two seed openers, and the fertilizer application point is approximately equally spaced between the two seed application points. An example of such a machine is the John Deere 1895 Air Drill with two rows of disk-type rockshaft-mounted seed openers combined with one row of disk-type rockshaft-mounted fertilizer openers. Another example is the Bourgault 5710 Air Hoe Drill with shank-type frame-mounted seed openers and frame-mounted disk-type fertilizer openers. Disk-type openers are relatively complex and expensive compared to hoe openers. However, disks tend to have lower draft and higher residue flow capacity. Controlling fertilizer placement depth on frame mounted fertilizer openers can be difficult and time-consuming.

On implements wherein the operating depth of a shank opener is set by the machine frame position, changes in fertilizer placement relative to seed placement require adjustment of the position of a disk-type fertilizer opener relative to the frame. Changes in the disk opener position relative to the frame are also required to raise the disk opener above the ground surface when only the shank openers are in use. Rockshaft mounted openers typically have a limited range of preferred rotational position due to a limited acceptable range of attack angles between the application boot and the soil surface.

SUMMARY OF THE INVENTION

It is therefore an object of the present invention to provide an improved implement having different sets of tools. It is a further object to provide such an implement which overcomes most or all of the aforementioned problems.

It is another object of the invention to provide an improved implement having both seeding and fertilizing tools. It is yet another object to provide such an implement which includes front mounted fertilizer openers and rear mounted seeding tools.

It is a further object of the present invention to provide an improved combination fertilizer and seeding implement having disk type fertilizer openers and frame-mounted seeding tools. It is yet another object to provide such an implement with front, rockshaft mounted fertilizer openers.

It is still another object of the present invention to provide an improved implement having a frame-mounted rockshaft carrying tools. It is another object to provide such an implement wherein the rockshaft is adjustable vertically relative to the frame for accommodating different ranges of frame operating heights.

Implement construction includes a front section of disk type fertilizer openers and a rear section of frame mounted tools such as seed openers. The openers are connected by drawbars to a rockshaft which is vertically adjustable to accommodate different ranges of operating depths of the frame mounted tools. The construction combines the lower draft, better residue cutting ability and higher residue flow capacity of a disk type opener with the lower cost, lower complexity and wider choice of soil engagement devices of a shank type opener. In addition, since the shank depth is set by frame height, readjustment of operating depth of all shanks can be accomplished easily and rapidly by changing frame height. The vertical adjustability of the rockshaft facilitates a wide range of frame operating heights for different tool depths while maintaining optimum disk opener drawbar angles.

DESCRIPTION OF THE PREFERRED EMBODIMENT

Figure 1:
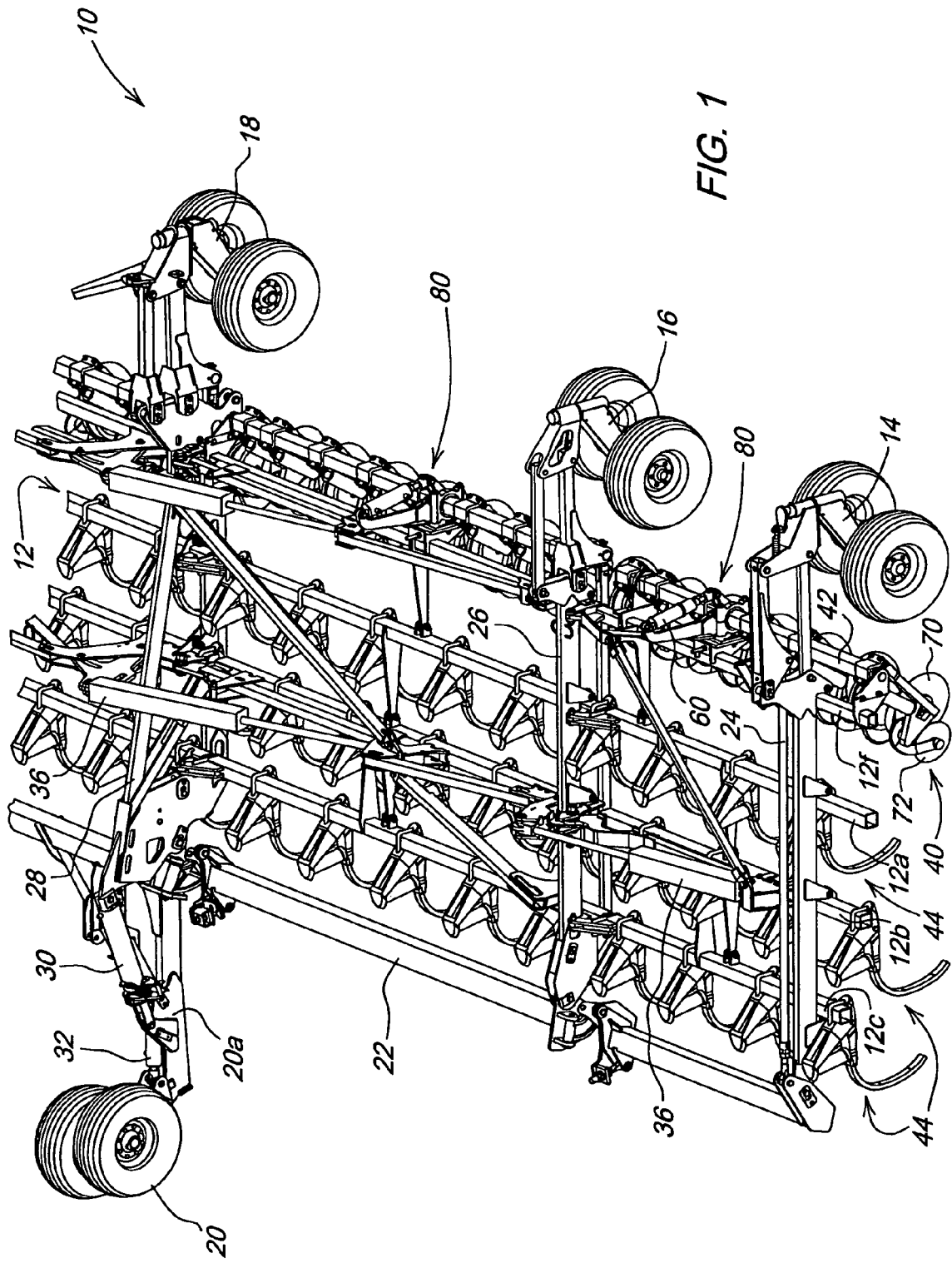
FIG. 1 is a front perspective view of a portion of an implement having a forward rockshaft supporting forward disk type openers and rear frame mounted tools.
Figure 2:
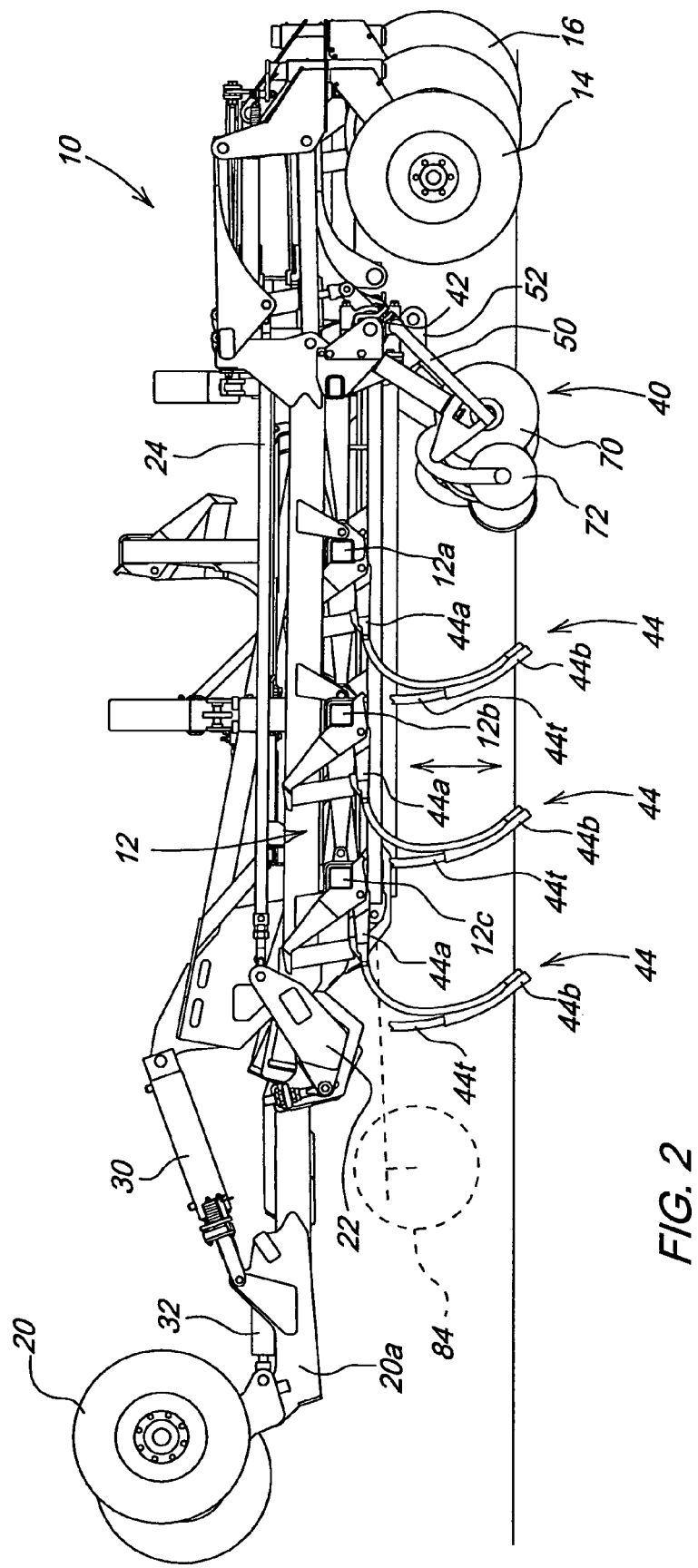
FIG. 2 is an enlarged side view of the implement of FIG. 1.

Referring now to FIGS. 1 and 2, therein is shown a portion of a multi-section implement 10 having a main frame 12 supported by vertically adjustable forward ground wheel assemblies 14, 16 and 18 for forward movement over a field. Rear ground wheel assemblies 20, shown rotated upwardly to the retracted field-working position, are connected to a rear flexible rockshaft 22 forming part of the frame 12 and are rockable downwardly relative to the frame 12 to support the rear of the implement 10 for transport. Lift linkages 24, 26 and 28 are connected between the rockshaft 22 and the wheel assemblies 14, 16 and 18, respectively. Main lift cylinders 30 connected between the wheel assemblies 20 and the frame 12 rotate the rockshaft 22 to raise and lower the wheel assemblies 14-20 relative to the frame. Rear wheel positioning cylinders 32 are connected between wheel arms 20a and the wheel assemblies 22 to rotate the wheels upwardly (shown) to provide ground clearance for field-working operations and downwardly to provide rear frame support during transport. The cylinders 32 are plumbed in combination with implement frame cylinders 36 which fold the implement 10. As the cylinders 36 are retracted to fold sections of the frame 12 for transport, the cylinders 32 extend to move the wheel assemblies 20 downwardly. When the frame sections are unfolded for field-working operations by extending the cylinders 36, the cylinders 32 retract to move the wheel assemblies 20 upwardly. In the field, the forward wheel assemblies 14-18 are adjusted vertically with respect to the frame 12 to change frame height relative to the ground and adjust planting depth, as described in detail below.

As shown, the implement 10 is a combination seeding and fertilizing implement having a set of forward fertilizer openers 40 connected to a forward flexible rockshaft 42 and rear frame-mounted hoe-type seed openers 44. As the frame 12 is raised and lowered during field-working operations, the operating depth of the seed openers 44 is adjusted. The forward fertilizer openers 40 are shown as disk-type openers having drawbars 50 with upper forward ends connected by lower portions of drawbar brackets 52 to the rockshaft 42. Spring and tension link assemblies 54 are connected between upper portions of the brackets 52 and lower rearward ends of the drawbar 50 to bias the drawbar assembly downwardly during field-working operations and to lift the fertilizer openers 40 from the ground when the rockshaft 42 is rotated in the clockwise direction as viewed in the drawings. A motor or rockshaft cylinder 60 having a rod end connected to a rockshaft bracket 62 and a base end connected to a frame bracket 64 rotates the rockshaft 42 to raise and lower the fertilizer openers 40 and to adjust the downpressure on the openers when in the field-working position. Angled opener disks 70 and depth gauging wheels 72 are mounted on the lower aft ends of the drawbars 50. Fertilizer boots 74 open downwardly on the shadow side of the angled disks 70 and deposit material in furrows opened by disks 70. Trailing closing wheels 76 supported by inverted U-shaped brackets 78 from the aft ends of the drawbars 50 close the furrow and firm the soil over the deposited material.

The main frame 12 includes transverse members or ranks 12a, 12b and 12c offset rearwardly of a forward frame member 12f. The forward frame member 12f carries adjustable rockshaft support structure 80 for selectively mounting the rockshaft 42 at one of a plurality of vertically spaced locations depending on the operating height of the frame 12 to maintain opener drawbar angle within a desired range. The rear ranks 12a-12c support transversely spaced shank assemblies 44a with C-shaped shanks having lower ends with hoe-type or other suitable openers 44b. Seed tubes 44t connected to a source of seed (not shown) provide seed to furrows opened by the openers 44b. Gangs of trailing press wheels 84 (FIG. 2) close and firm soil over the seed furrows. The fertilizer openers 40 are typically spaced on the rockshaft 42 to provide fertilizer application points centrally between two adjacent rows of seed. The depth of penetration of the openers 44b is determined by the height of the frame 12 above the surface of the ground, and by adjusting the wheel assemblies 14-18 the planting depth of the entire implement 10 can be easily changed.

The adjustable rockshaft support structure 80 facilitates vertical adjustment of the rockshaft 42 relative to the frame 12 so that the operating range of the angles of the drawbar 50 are optimized. For example, for relatively deep seeding depth operations, the rockshaft 42 can be raised relative to the frame to prevent the drawbar angles from decreasing beyond a minimum desired angle. Conversely, for shallower seed opener operations wherein the frame 12 is in a relatively higher position, the rockshaft can be lowered to maintain the drawbars within the desired operating angle range.

Figure 3:
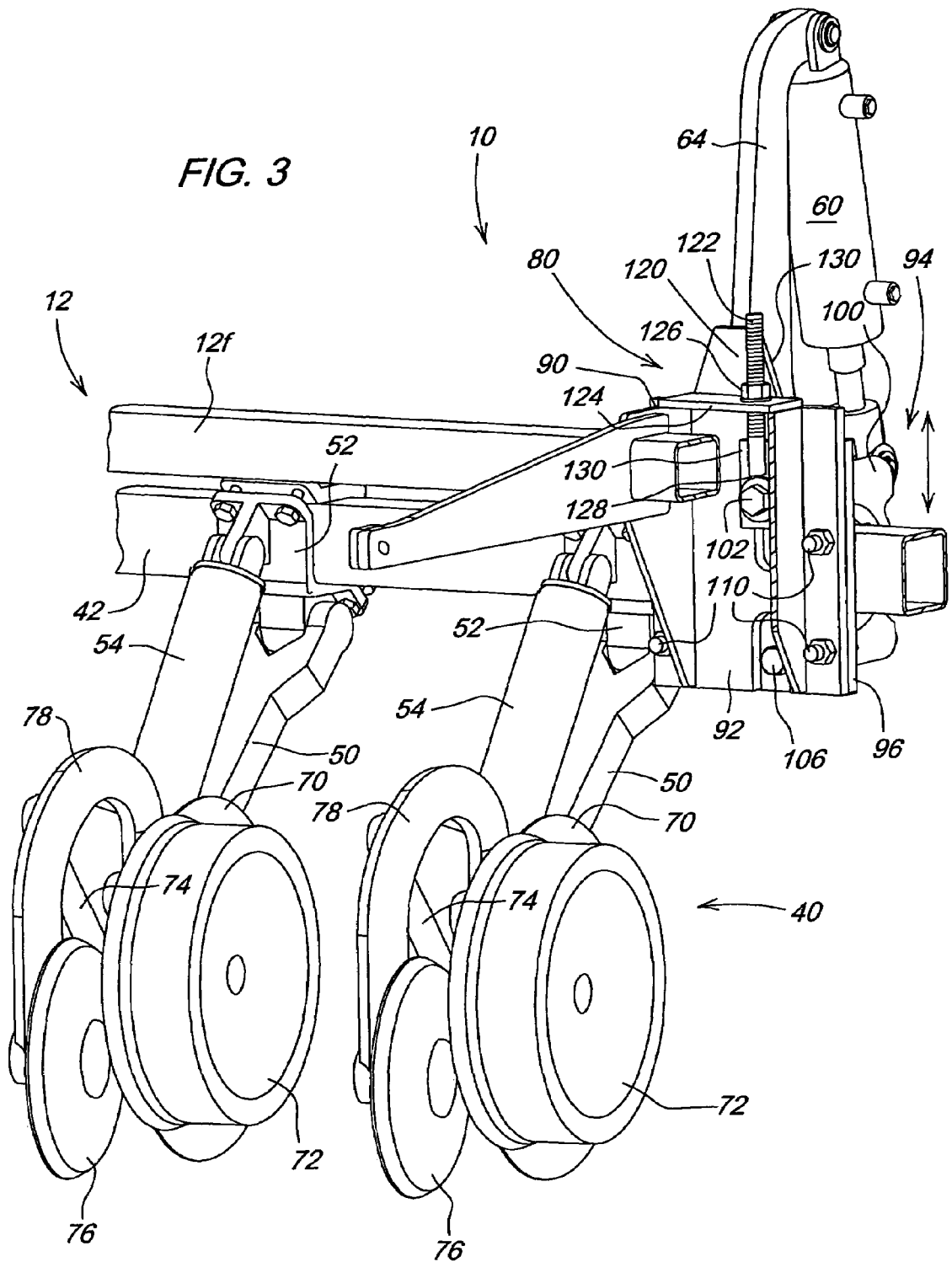
FIG. 3 is a rear perspective view of a front portion of the implement of FIG. 1 showing the adjustable rockshaft support structure.
Figure 4:
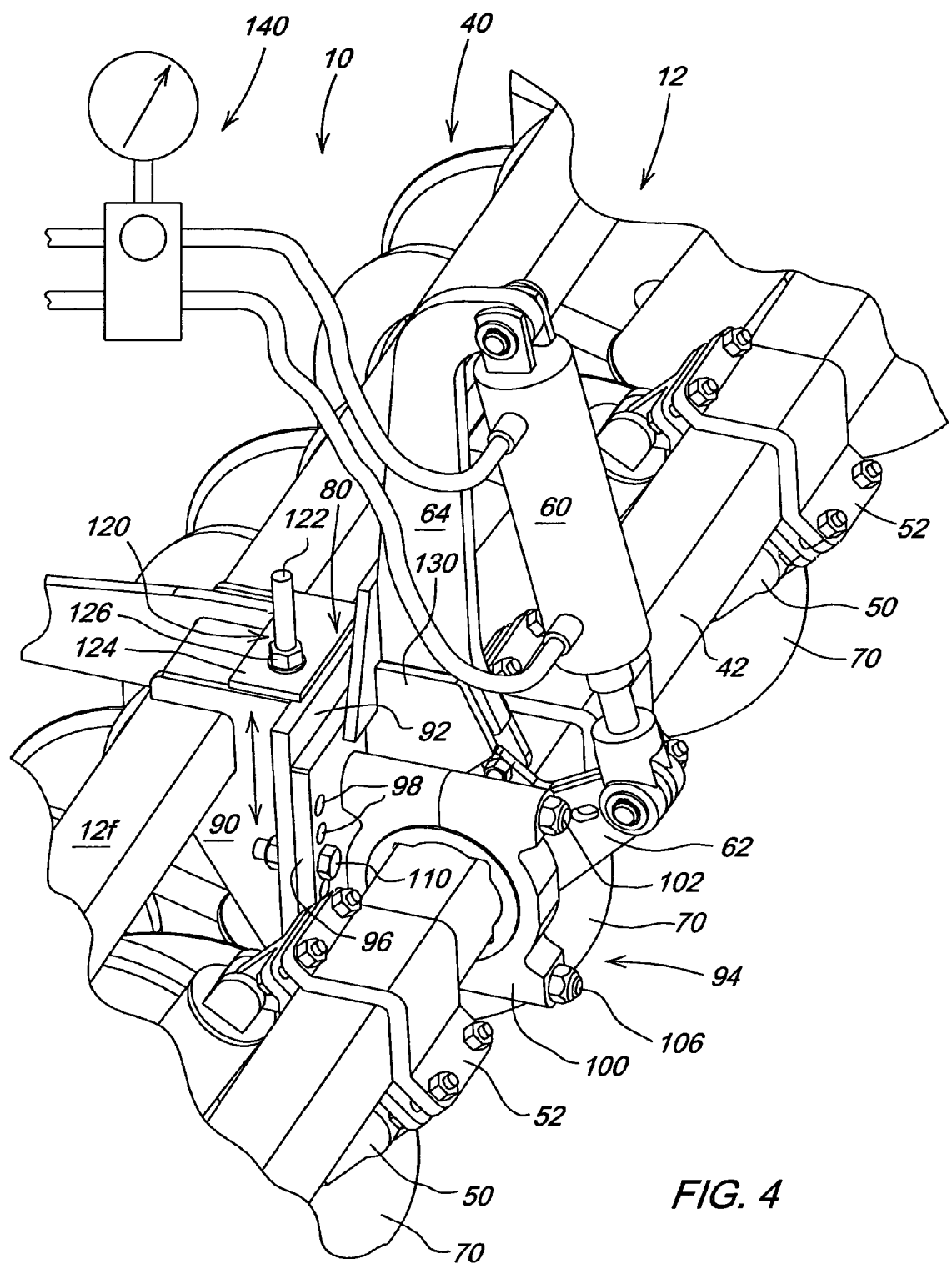
FIG. 4 is a front perspective view of the rockshaft support structure of FIG. 3.

As best seen in FIGS. 3 and 4, each adjustable rockshaft support structure 80 includes a frame bracket 90 supported from the forward frame member 12f and having a forward slotted wall 92. A bearing block support 94 includes a rear plate 96 with vertically spaced apertures 98 (FIG. 4) which abuts the slotted wall 92. A split bearing block assembly 100 which rotatably supports the rockshaft 42 is secured to the back of the slotted wall 92 and against the plate 96 by bolts 102 and 106, respectively. Bolts 110 pass through selected sets of the apertures 98 and apertures in the slotted wall 92 which align with the apertures 98. The set of apertures are selected to position the rockshaft 42 at the desired vertical location with respect to the frame 12. The plate 96 can be repositioned relative to the slotted wall 92 to change the vertical location of the rockshaft.

To facilitate easier vertical adjustment of the rockshaft 42, an adjustable support structure 120 extends between the frame bracket 90 and the bearing block attachment structure. As shown, the support structure 120 includes a threaded end 122 extending upwardly through an aperture in a horizontal member 124 on the bracket 90. A nut 126 threaded onto the end 122 maintains the support structure 120 in the bracket aperture and facilitates vertical adjustment of a lower eye end 128 which receives the end of the upper bearing block bolt 102. The bolt 102 also passes through a backing plate or bracket support 130 which abuts the slotted wall 92 adjacent the slot. The change the vertical location of the rockshaft 42 relative to the frame 12, the bolts 110 are removed and the bearing block bolt 102 is loosened. The structure 120 supports the rockshaft 42 when the bolts 110 are removed from the apertures. The operator then rotates the nut 126 to raise or lower the eye end 128 until the set of apertures 98 in the plate 96 align with the apertures in the wall 92 providing the desired .height setting. The slots in the wall 92 facilitate vertical movement of the bearing block bolts and thus the bearing block support 94. The bolts 110 are then inserted into the aligned sets of apertures and tightened secure the rockshaft 42 ins position relative to the frame 12. The support structure 120 therefore supports the rockshaft 42 during adjustments and helps align the apertures for easy insertion of the bolts 110.

The frame bracket 64 for the rockshaft cylinder 60 is also connected to the plate 96 by a bracket support 130 adjacent the bearing block support 94. Therefore, the cylinder 60 automatically maintains proper positional relationship with the rockshaft 42 as the rockshaft height is adjusted. The cylinders 60 can be connected by a conventional hydraulic system to an adjustable pressure regulator 140 to provide adjustable downpressure for the leading fertilizer openers 40.

Having described the preferred embodiment, it will become apparent that various modifications can be made without departing from the scope of the invention as defined in the accompanying claims.

The invention claimed is:

1. A combination implement adapted for forward movement over the ground, the implement comprising a generally rectangular frame having a transversely extending forward frame member and transversely extending trailing frame members, a transversely extending rockshaft rotatably connected to the forward frame member and positioned forwardly of the forward frame member, a plurality of fertilizer openers spaced along the rockshaft and extending downwardly and rearwardly from the rockshaft, the fertilizer openers including opening disks and opener depth gauging wheels for depositing material in the ground, a plurality of ranks of frame mounted seed openers spaced on the trailing frame members rearwardly of the fertilizer openers for engaging the ground rearwardly of the fertilizer openers, lift structure for raising and lowering the frame relative to the ground to change operating depth of the frame mounted seed openers, and means for rotating the rockshaft to change orientation of the fertilizer openers relative to the frame and operating downpressure of the fertilizer openers.

2. The implement as set forth in claim 1 including a bearing support, bearing structure rotatably mounting the rockshaft to the frame and connected to the bearing support, wherein the bearing support is vertically adjustable relative to the frame for selectively mounting the rockshaft at one of a plurality of vertically spaced locations relative to the forward frame member to thereby maintain the orientation of the fertilizer openers generally constant with changes in the operating death of the frame mounted seed openers.

3. The implement as set forth in claim 1 further comprising lift structure connected between the frame and the rockshaft and facilitating vertical adjustment of the rockshaft relative to the frame.

4. The implement as set forth in claim 3 wherein the lift structure comprises an upright screw member.

5. The implement as set forth in claim 3 wherein means for rotating the rockshaft includes a motor connected to the lift structure for vertical movement with the rockshaft.

6. The implement as set forth in claim 1 wherein the frame includes first and second trailing frame members located rearwardly of the forward frame member, the frame mounted seed openers comprise hoe openers connected to the trailing frame members in at least two trailing ranks, and the fertilizer openers include drawbar members connected to the rockshaft and rotatable with the rockshaft to vary the downpressure of the fertilizer openers.

7. The implement as set forth in claim 6 including means for adjusting the rockshaft vertically relative to the frame to adjust drawbar member angle for a given operating depth of the frame mounted seed openers.

8. The implement as set forth in claim 7 wherein the means for adjusting the rockshaft vertically includes a vertically adjustable bearing block support.

9. The implement as set forth in claim 8 wherein the means for rotating the rockshaft includes a motor connected to the vertically adjustable bearing block support.

10. The implement as set forth in claim 8 wherein the means for adjusting the rockshaft vertically includes a screw thread member connected between the frame and the bearing block support.

11. A combination fertilizer and seeding implement adapted for forward movement over the ground, the implement comprising a frame having a transversely extending forward frame member, a transversely extending rockshaft rotatably connected to the forward frame member, a plurality of disk fertilizer openers with depth gauging wheel structure for depositing material in the ground, the disk fertilizer openers having opener drawbars spaced along and extending downwardly and rearwardly the rockshaft and operable at different operating angles, a plurality of frame mounted seed openers having shanks spaced on the frame rearwardly of the fertilizer openers in ranks for engaging the ground rearwardly of the fertilizer openers, lift structure for raising and lowering the frame relative to the ground to change operating depth of the ranks of seed openers, and a motor connected to the rockshaft and operable for rotating the rockshaft to change the operating angles of the drawbars to maintain generally constant operating angles with the change in operating depth of the seed openers.

12. The implement as set forth in claim 11 including rockshaft support structure connected between the frame and the rockshaft, the rockshaft support structure located forwardly of the forward frame member and movable for adjusting of the rockshaft vertically with respect to the frame.

13. The implement as set forth in claim 12 wherein the motor comprises a hydraulic cylinder and the rockshaft support structure includes a cylinder mount supporting an end of the cylinder and moving the cylinder vertically with adjustment of the rockshaft.

14. The implement as set forth in claim 12 including a screw thread member connected to the rockshaft support structure facilitating vertical movement of the rockshaft during adjustment.

15. The implement as set forth in claim 12 including pressure adjusting structure connected to the motor for adjusting downpressure of the fertilizer openers.

16. An implement adapted for forward movement over the ground, the implement comprising a frame having a forwardmost transversely extending leading frame member and a plurality of trailing transversely extending frame members, seeding tools connected to the trailing frame members in ranks for operation in the ground, a transversely extending rockshaft rotatably connected to the leading frame member, a plurality of fertilizer openers including opener drawbar arms spaced along the rockshaft and extending downardly and rearwardly from the rockshaft under the leading frame member for operating over a range of operating angles, the fertilizer opener depositing material in the ground, and lift structure for raising and lowering the frame relative to the ground to change operating depth of the seeding tools over a range of operating depths, motor structure for rotating the rockshaft to change the operating angles of the drawbar arms, and rockshaft adjustment structure connected between the frame and the rockshaft for raising and lowering the rockshaft relative to the frame to facilitate a generally constant angular relationship between the fertilizer openers and the ground with changes in the range of operating depths.

17. The implement as set forth in claim 16 wherein the rockshaft adjustment structure includes a vertically adjustable bearing block support.

18. The implement as set forth in claim 17 wherein the rockshaft adjustment structure includes a motor support connected to the vertically adjustable bearing block support and supporting the motor structure.

19. The implement as set forth in claim 16 wherein the rockshaft adjustment structure includes a screw thread member connected between the frame and the rockshaft.

20. The implement as set forth in claim 19 wherein the screw thread member supports the rockshaft from the frame during raising and lowering of the rockshaft.

* * * * *